United States Patent
Maffeis

(10) Patent No.: US 8,925,986 B2
(45) Date of Patent: Jan. 6, 2015

(54) CLAMP WITH TWO LONG-STROKE JAWS

(71) Applicant: GIMATIC S.p.A., Roncadelle (IT)

(72) Inventor: Giuseppe Maffeis, Roncadelle (IT)

(73) Assignee: GIMATIC S.p.A., Roncadelle (BS) (IT)

( * ) Notice: Subject to any disclaimer, the term of this patent is extended or adjusted under 35 U.S.C. 154(b) by 0 days.

(21) Appl. No.: 14/051,887

(22) Filed: Oct. 11, 2013

(65) Prior Publication Data

US 2014/0138972 A1 May 22, 2014

(30) Foreign Application Priority Data

Nov. 16, 2012 (IT) .............................. BS2012A0162

(51) Int. Cl.
  *B66C 1/42* (2006.01)
  *B25J 15/00* (2006.01)
  *B25J 15/02* (2006.01)

(52) U.S. Cl.
  CPC .......... *B25J 15/0028* (2013.01); *B25J 15/0253* (2013.01); *Y10S 901/38* (2013.01)
  USPC ......................................... 294/119.1; 901/38

(58) Field of Classification Search
  CPC .... B65G 47/90; B25J 15/0253; B25J 15/026; B25B 5/06; B25B 1/06; B25B 1/18
  USPC ................... 294/119.1, 207; 901/38; 269/227
  See application file for complete search history.

(56) References Cited

U.S. PATENT DOCUMENTS

| | | | |
|---|---|---|---|
| 4,593,948 A * | 6/1986 | Borcea et al. | 294/202 |
| 4,808,898 A * | 2/1989 | Pearson | 318/568.21 |
| 5,947,539 A | 9/1999 | Long et al. | |
| 6,394,521 B1 * | 5/2002 | Bertini | 294/207 |
| 6,428,071 B2 * | 8/2002 | Bertini | 294/119.1 |
| 6,523,875 B1 | 2/2003 | Ostholt | |
| 2001/0028175 A1 * | 10/2001 | Thompson et al. | 294/119.1 |
| 2005/0093318 A1 * | 5/2005 | Bellandi et al. | 294/88 |
| 2006/0125260 A1 | 6/2006 | Chae et al. | |
| 2011/0247438 A1 * | 10/2011 | Maffeis | 74/55 |
| 2013/0334831 A1 * | 12/2013 | Maffeis | 294/207 |

FOREIGN PATENT DOCUMENTS

| | | |
|---|---|---|
| EP | 2374580 A2 | 10/2011 |
| WO | 03068456 A1 | 8/2003 |

* cited by examiner

*Primary Examiner* — Saul Rodriguez
*Assistant Examiner* — Gabriela Puig
(74) *Attorney, Agent, or Firm* — Volpe and Koenig, P.C.

(57) ABSTRACT

A clamp (1) is described for manipulators including a body (2) provided with two coplanar seats (21, 22) for housing the respective jaws (G1, G2). The jaws (G1, G2) are translatable in parallel in the respective seats (21, 22) alternately in the two ways, between a retracted position and an extended position, with average- or long-stroke. The clamp further includes an electrical motor (M) for activating the jaws and an electronic unit (CPU) for controlling the electric motor, inside the body (2) of the clamp (1). A transmission assembly is operatively interposed between the electric motor and the jaws, and includes in its turn two pushing screws (V1, V2) and respective translation assemblies (GT1, GT2). The rotation given by the electric motor (M) to the counter rotating pushing screws (V1, V2) causes the translation in opposite directions of the translation assemblies (GT1, GT2), which trail the jaws (G1, G2).

10 Claims, 5 Drawing Sheets

CLAMP WITH TWO LONG-STROKE JAWS

FIELD OF THE INVENTION

The present invention claims priority of the Italian patent application n. BS2012A000162 filed on Nov. 16, 2012 and relates to a clamp with two average- or long-stroke jaws, in particular to an electrically activated clamp with two parallel average- or long-stroke jaws.

BACKGROUND

In the industrial automation field the use of robotized manipulators is known, a gripping clamp for the objects to be manipulated being normally associated with.

The clamps are provided with a body housing the jaws, also called grips or gripping fingers, and the corresponding activating device. The jaws are movable between a first not-operating position or releasing position, where they do not apply any pressure on the piece to be manipulated and an operating position, or gripping position, where they apply a pressure on the piece to be manipulated adequate to provide the workpiece not becoming accidentally free during its movement. The device for activating the jaws can be electric, pneumatic, oleo-pneumatic, etc.

According to the number of the jaws and their movement, they can be clamps having two jaws, which can be parallel, radial or angular, clamps having three jaws, etc.

The present invention relates to the electrically driven clamps with two parallel jaws. Some examples are given in EP-A-2374580, JP-A-2009226506, JP-A-2010094787, U.S. Pat. No. 5,947,539 and WO 03/068456.

A further specification relates to the jaws stroke. On the market clamps with two parallel short- or average-stroke jaws are considered those clamps wherein the jaws have both a stroke shorter than 10-15 mm, and clamps with two parallel long-stroke jaws are considered those clamps whose jaws both have a stroke greater than 10-15 mm, for example 20 mm, 40 mm, 100 mm, 200 mm, etc.

A practical example of an electrically driven clamp with two parallel long-stroke jaws, is constituted of the series HGPLE clamp commercialized by the company Festo AG & Co. KG (HGPLE-25-40-2,8-DC-VCSC-G85).

Other examples are constituted of the clamps series GEH6000 and GEH8000 commercialized by the Sommer-Automatic company, belonging to Zimmer-Group.

Generally, the electric motor is housed in the clamp body and controls the jaw translation, alternately in the two ways, by means of a transmission assembly constituted of gears and a drive belt, or of a worm, which meshes the jaws, or yet a gear wheel which meshes respective racks integral with the jaws, etc.

The manufacturers provide an electronic unit needed for controlling the operations of the electric motor. Such an unit is particularly expensive and complicated to realize and develop and has, among the others, the task of activating the electric motor, inverting the drive shaft rotation to change the translation way of the jaws, interrupting the power supply of the drive shaft when the jaws encounter an excessive resistance in the respective path—so as to avoid overloads—, stopping the motor, etc.

Independently from the technical solution adopted for transmitting the motion from the shaft of the electric motor to the jaws, that is to say independently from the configuration of the transmission assembly, the above described clamps suffer from some not negligible drawbacks.

The most relevant drawback consists in that the electronic unit needed for controlling the electric motor is outside the body of the clamp itself. Usually a proper electric connector is provided on the clamp body for connecting to the outer control unit. In many applications the control unit remains proximal to the clamp, often constrained to the manipulator by its side, and therefore negatively affects the bulks. In particular in many applications the clamp has to be inserted into a seat of the piece to be manipulated and the possible presence of the control unit can remarkably limit the freedom of movement of the clamp itself, meaning that the displacements have to be calculated to take the bulk of the control unit into account.

A further drawback is constituted by the weigh of the control unit. In case such a unit is positioned on the manipulator with its respective clamp, the mass of the control unit negatively affects the dynamical performance of the manipulator.

Yet another drawback of the conventional solutions consists in that the transmission assembly operating the transmission of the motion from the electric motor shaft to the jaws, in case the involved stresses are high or the gears are worn, does not assure the maintenance of the so called gripping center, that is to say it can occur that the jaws do not reach the respective limit positions simultaneously or one of the jaws does not reach its own limit position exactly.

SUMMARY

Object of the present invention is to provide an electrically driven clamp with two parallel average- and/or long-stroke jaws, which simply and effectively solves the drawbacks of the known solutions, while being compact, lightweight and reliable.

The present invention relates therefore to a clamp according to claim 1.

In particular, the clamp comprises a body, provided with two reciprocally coplanar and parallel seats, that is to say side by side, in both of which a respective jaw is slidingly housed. The two jaws are both translatable in parallel in the respective seat alternately in the two ways, between a retracted position and an extended position. The jaws have average and/or long strokes, for example greater than 10-15 mm, or however the strokes can be considered average or long by the skilled technician, based on the size of the clamp.

The distal and proximal positions correspond to the gripping and releasing positions, respectively, or vice versa, according to the requirements.

In the clamp body an electric motor, preferably of the brushless type, and a respective electronic control unit, preferably of the microprocessor type, are further housed.

Between the seats of the jaws and the electric motor, in the clamp body, two coplanar pushing screws are housed, prearranged in parallel with the jaws and mutually engaged by means of respective gear wheels. The shaft of the electric motor meshes one of the two pushing screws; with this configuration the rotation given by the electric motor to the respective pushing screw, in a way, is unidirectionally transmitted to the other pushing screw in the opposite way.

The clamp further comprises two translation assemblies, both constrained to a jaw so that to translate integrally with the same. In particular, the translation assemblies both mesh the threaded portion of one of the two pushing screws; due to this configuration, the rotation of the pushing screws drives the corresponding translation of the two translation assemblies in the opposite way, and the two translation assemblies in their own turn trail the jaws towards the respective limit positions.

The two pushing screws and the respective translation assemblies define the transmission assembly of the clamp. The rotation given by the electric motor to the counter rotating pushing screws causes the translation in opposite directions of the translation assemblies, which trail the jaws.

Advantageously the described configuration allows:
avoiding the use of outer units for controlling the electric motor;
minimizing the bulks and the weights of the clamp;
obtaining a synchronous activation of the jaws, and therefore the simultaneous reaching of the precise limit positions, in all the conditions of use of the clamp, after thousands of working cycles and under stress as well.

In particular, the use of a brushless, and preferably direct current and long electric life motor, combined with the translation assemblies, makes the control of the motor itself as simple as possible. For example, encoders for acquiring information related to the number of revolutions made by the shaft of the electric motor are not necessary.

Moreover the clamp can have a particularly flat shape with respect to known clamps, this leading to obvious positive effects on reduction and distribution of the overall weight of the clamp itself with respect to the known art. Thanks to the fact that the control function of the electric motor is easy to obtain with respect to the known solutions, for the above described reasons, the electronic unit for controlling the electric motor can be realized with minimal bulks, for example such as a printed circuit which can be housed in the clamp body and comprising a single microprocessor which controls the motor operations based on the programs stored within. Therefore, outer control units, for example complicated and expensive Programmable Logic Controller (PLC) interfaces, are not required.

A further advantage offered by the clamp according to the present invention is given by the fact that the movement of the parallel jaws is always synchronous, due to the configuration of the transmission assembly used to transmit the motion from the electric motor to the jaws. The two pushing screws are also functionally coupled, that is to say provided with meshed gear wheels, so that to rotate at the same speed, but in the opposite way, when the electric motor is activated and to stop at the same instant when the electric motor is deactivated. Whenever the components of the transmission assembly are prone to regular wear too, the synchronism and the precision of the positioning of the jaws are not lost.

In addition, the symmetry of the transmission assembly allows for obtaining an optimal distribution of stresses.

For all of the reasons above, the clamp according to the present invention is self-centering.

Preferably, the translation assemblies are coupled to the respective jaws by means of a pin slidingly inserted through an eyelet obtained on the bottom of the guides of the jaws.

Preferably, each translation assembly is provided with a balancing mechanism, for example of elastic type, able to adjust in advance the strength the jaws will exert on the pieces to be manipulated also when their diameter changes, that is to say when the limit positions of extension of the jaws change. In this circumstance, the translation assemblies further perform the function of releasing the electric motor from the task of pushing and keeping the jaws exactly in the respective engaging positions of the piece. In other words, due to the presence of the balancing mechanism the power supply to the electric motor can be interrupted in different circumstances, when the balancing assemblies keep the jaws gripped with the piece.

In the preferred embodiment, each translation assembly comprises a cursor, a tow slide and one or more balancing preloaded elastic elements—preferably a helical spring. The tow slide is meshed on the threaded portion of the respective pushing screw and the cursor is mounted on the tow slide so that to be able to translate with respect thereto in the two ways of a direction parallel to the displacement direction of the respective jaw. The balancing elastic element is operatively interposed between the tow slide and the cursor. The preload is fixed by the manufacturer based on the use requirements of the clamp. The cursor and the tow slide can translate both integrally, till the preload of the elastic element does not change, and independently from one another, in response to a preload change of the elastic element produced by a resistance exerted against the translation movement of the jaws.

Preferably the two jaws comprise a rack portion and between the two jaws a gear wheel is arranged which simultaneously engages the rack portion of both jaws. The gear wheel is rotatably constrained to the clamp body. This characteristic is useful for optimally distributing the stresses, strengthening the clamp and holding the synchrony of the jaws.

Preferably, the electric motor is positioned under the pushing screws for obtaining a minimization of the side bulks of the clamp. In their turn, the two pushing screws are placed both under the respective jaw and among these elements the corresponding translation assembly is positioned.

BRIEF DESCRIPTION OF THE DRAWINGS

Further characteristics and advantages of the present invention will be more evident from a review of the following specification of a preferred, but not exclusive, embodiment, shown for illustration purposes only and without limitation, with the aid of the attached drawings, in which.

DETAILED DESCRIPTION OF THE PREFERRED EMBODIMENTS

The enclosed FIGS. 1-5 show the preferred embodiment of the clamp 1 according to the present invention, comprising a body 2 housing the respective components.

Two jaws G1, G2 are housed in respective seats, or lanes, 21-22 that extend parallel on the upper portion of the clamp 1. Two jaws G1, G2 are intended to be translationally pushed into the respective seats 21-22 between a retracted position and an extended position corresponding, respectively, to the grip and the release of the piece to be manipulated, or vice versa.

The jaws G1, G2 can interact with the piece to be manipulated directly, or by means of protruding gripping elements attached to the bushings B provided on both jaws G1, G2.

Merely by way of example the stroke of both jaws G1, G2 is equal to 15 mm, or greater, according to the sizing of the clamp 1.

In case the clamp has a smaller size with respect to the size shown in figures, the stroke of the jaws could also be smaller than 15 mm, for example 8 mm, still being an average or long stroke for the skilled person.

Figure 1:
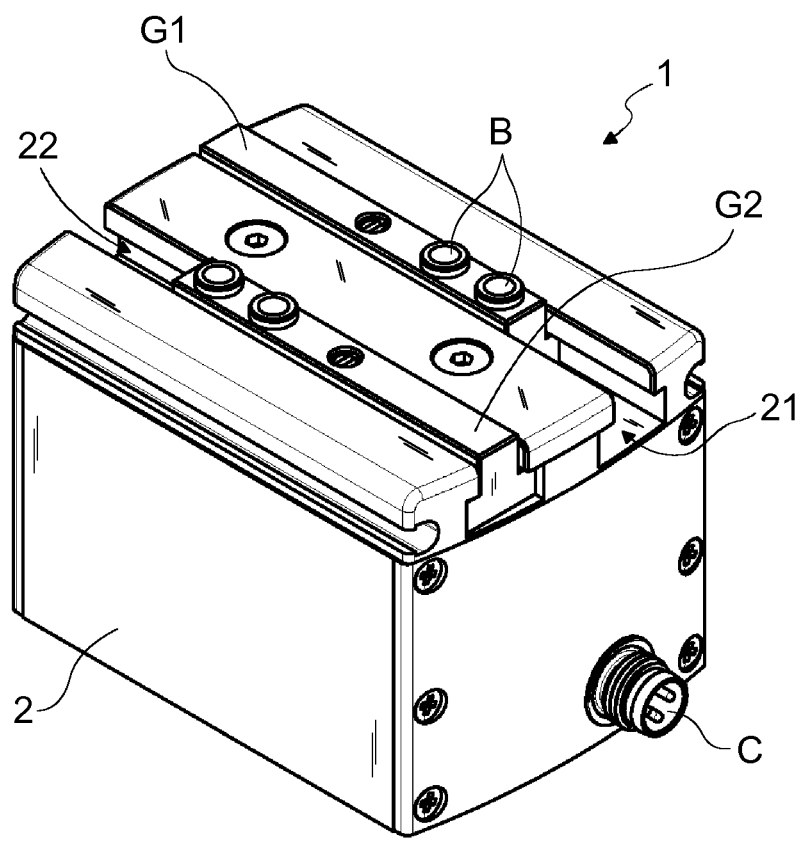
FIG. 1 is a perspective view of an electrically activated clamp, with two parallel long stroke jaws, according to the present invention.
Figure 2:
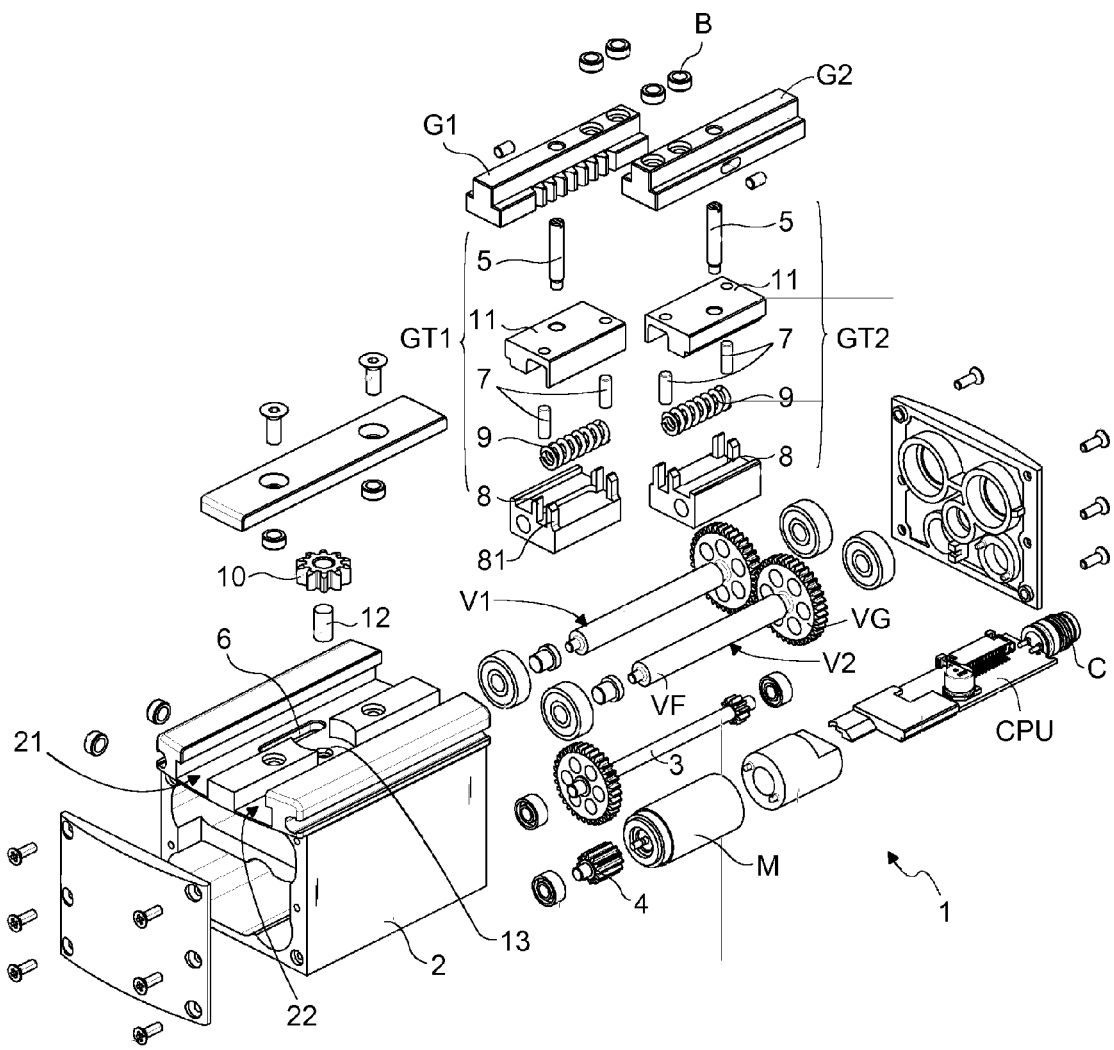
FIG. 2 is an exploded view of the clamp shown in FIG. 1.

FIG. 2 shows in detail the components of the clamp 1.

In the body 2 of the clamp an electric motor M, specifically of the direct current DC brushless type, two pushing screws V1 and V2 positioned above the motor M and respective translation assemblies GT1 and GT2 positioned between the pushing screws V1 and V2 and the jaws G1, G2, are housed.

In particular, the pushing screws V1 and V2 and the translation assemblies GT1 and GT2 are part of the transmission assembly of the clamp 1 to which the task is given of transmitting the translation movement to the jaws G1, G2 in response to the activation of the electric motor M.

Both pushing screws V1 and V2 comprise a threaded stem VF with non-reversible thread and a gear wheel VG constantly engaged with the gear wheel VG of the other pushing screw, so that the pushing screws V1 and V2 are counter rotating. The shafts VF of the two pushing screws V1 and V2 are parallel and coplanar one to another and extend in parallel both to the respective jaw G1 or G2. The two pushing screws V1 and V2 are preferably made of steel or acetalic resin filled with carbon fibers.

Only the pushing screw V2 is rotated by the shaft of the electric motor M by means of an energy chain comprising the gears 3 and 4. Therefore, the electric motor M directly controls the rotation of the pushing screw V2 in the two ways and also controls the respective stop. In its turn, the second pushing screw V2 transmits these movements to the first pushing screw V1.

The threaded stem VF of the pushing screws V1 and V2 engages the corresponding translation assembly GT1, GT2, applying thereto a forward or rearward translation according to the clockwise or anti-clockwise rotation of the screw V1, V2.

The translation assemblies, by moving on the threaded stem VF of the respective pushing screw V1, V2, push the respective jaw G1, G2 to translate by means of a connecting pin 5 slidingly inserted through a through eyelet 6 obtained in the respective housing guide 21, 22.

As better shown in FIG. 2, each translation assembly comprises a tow slide 8, threaded underside or provided with a threaded hole, for engaging the threaded stem VF of the respective pushing screw V1, V2.

The tow slide 8 supports a cursor 11 slideably mounted with respect to the tow slide 8 itself. Between the slide 8 and the cursor 11 a helical spring 9 is interposed, not only physically but above all operatively. The coil spring 9 is compressively pre-loaded during the assembling step, directly by the manufacturer. At a later stage of the life of the clamp, 1 the springs 9 can be replaced with springs having a different preload, if needed.

The so composed translation assembly forms an elastic balancing device of the strokes of the jaws G1, G2.

Figure 5:
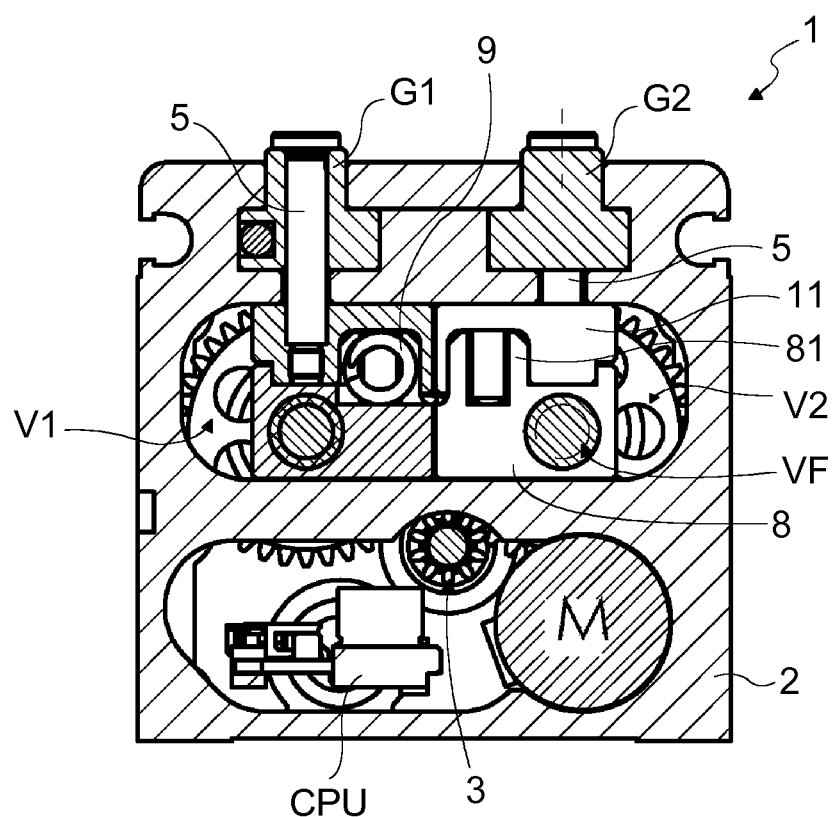
FIG. 5 is a sectional view, in a second cross sectional plane, of the clamp shown in FIG. 1.

The pins 7 remain integral with the cursor 11 and protruding towards the tow slide 8 so that to act as plungers of the spring 9 when the cursor 11 translates with respect to the respective tow slide 8. The pins 7 can be inserted between shoulders 81 of the slide 8, which define the seat of the spring 9 (FIG. 5).

Substantially, the tow slide 8 translated by the screw V1 (or V2) is always subjected to a fixed stroke, whereas the cursor 11 can translate also with respect to the tow slide 8 and so carry out variable strokes within certain limits as a function of the resistance in opposition to the movement the jaws G1, G2 encounter in gripping a piece. The springs 9 compress for absorbing the excess strength which the jaws G1, G2 would otherwise exert on the piece to be manipulated.

By activating the motor M and rotating the gears 3, 4, the rotation of the pushing screws V1 and V2 is controlled in opposite way. This causes the translation of the two tow slides 8 and the respective cursors 11 in opposite ways. The cursors 11 push the jaws G1 and G2 into the respective seats 21 and 22.

If the jaws G1, G2 do not encounter resistance, the translation assemblies GT1 and GT2 move rigidly as a whole. If the jaws G1, G2 meet resistance, for example coming in abutment against the inner surface of the piece to be manipulated, the springs 9 compress to absorb the thrust corresponding to the remaining stroke of the jaws G1, G2. In this circumstance the cursor 11 stops moving integrally with the tow slide 8 and translates with respect thereto; for example the slide 8 completes its stroke and the cursor 11 remains stationary since the jaws G1, G2 are in abutment against the piece to be manipulated.

Inside the body 2 of the clamp an electric unit CPU is housed for controlling the electric motor M. Such an unit is a printed circuit comprising a microprocessor which has the function of adjusting the electric power supply to the motor M according to specific programs which provide, among the others, the cut of the power supply when the jaws G1, G2 are in the piece gripping position and the springs 9 assure the grip itself will be hold.

A connector C allows connection of an electric power supply cable or a cable to interface the CPU unit with remote units for diagnostics, programming, etc.

Preferably, as shown in figures, the jaws G1, G2 are provided with rack portions GC opposed and continuously gripping a gear wheel 10 rotatably constrained to the body 2 of the clamp by a pin 12 inserted into a seat 13. In the simplest embodiments this feature can be absent.

Figure 3:
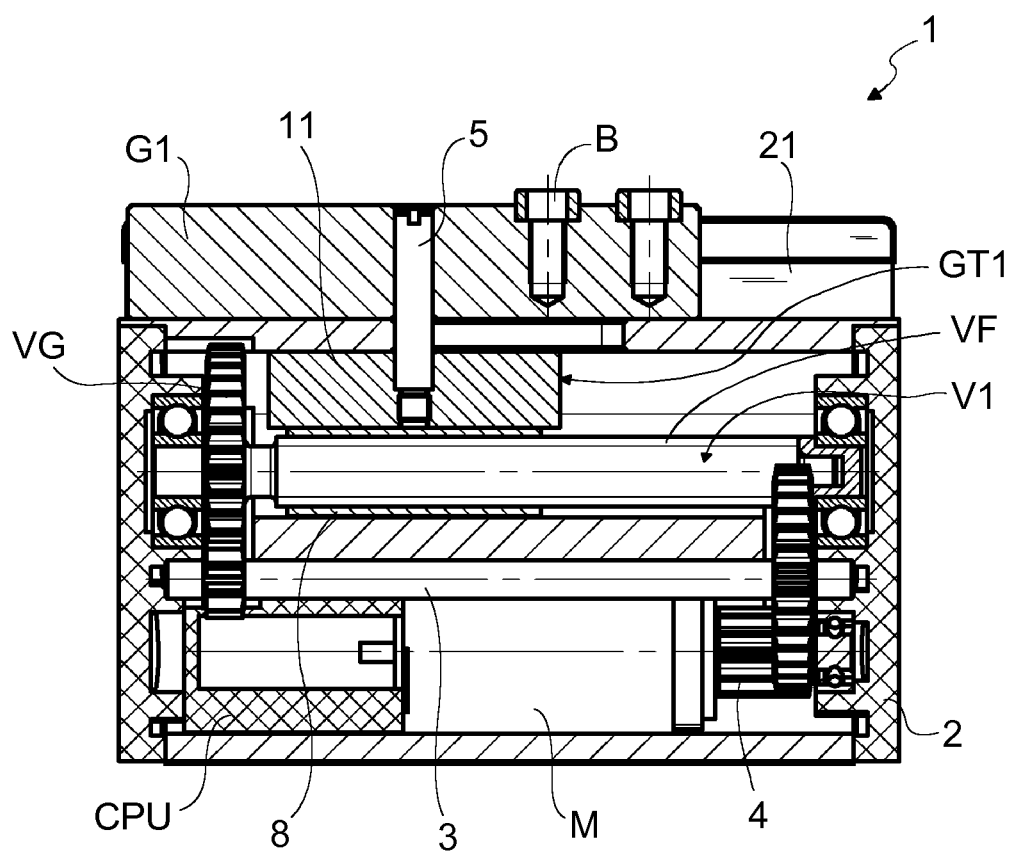
FIG. 3 is a sectional view in a longitudinal plane of the clamp shown in FIG. 1.

FIG. 3 specifically shows a section of the clamp 1 in a vertical median plane parallel to the jaws G1, G2. As a result, the clamp 1 is highly compact. All is needed to obtain the correct operation is housed inside the body 2. The control unit CPU and the motor M are in the low portion of the body 2; the pushing screws V1 and V2 are positioned above the motor, and the transfer gears 3 and 4 are interposed therebetween. On the screws V1 and V2 the translation assemblies GT1 and GT2 are fitted, respectively. Note in particular how the threaded stem VF is inserted on the tow slide 8. The pin 5 for connecting the slide 11 to the jaw G1 is further evident.

Figure 4:
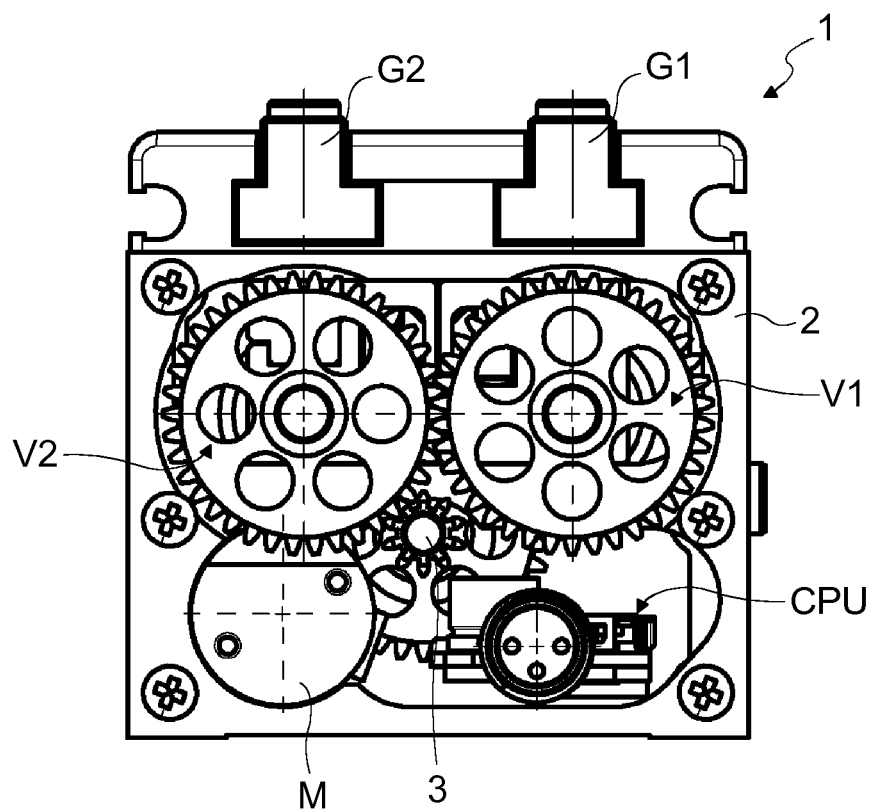
FIG. 4 is a sectional, in a first cross sectional plane, of the clamp shown in FIG. 1.

FIGS. 4 and 5 are sectional views in respective vertical planes orthogonal to the jaws G1, G2. In FIG. 4 it is evident that the motor M rotates the screw V2 by means of the element 3 and that the two pushing screws V1 and V2 are mutually meshed and can rotate in opposite ways only.

In FIG. 5 the arrangement of the components of the translation assemblies GT1 and GT2 is evident. In particular, the GT1 assembly is sectioned and the GT1 assembly is shown in elevation. The pins 7, integral with the cursors 11, can cross the shoulders 81 of the tow slide 8 to compress the spring 9, when needed.

Preferably, the transfer of the jaws G1, G2 from the extended position to the retracted position, or vice versa, is shorter than a tenth of second.

According to the sizing of the electric motor M, the jaws G1, G2 are able to exert a force on the piece to be manipulated preferably comprised between 100 N and 400 N.

The invention claimed is:

1. A clamp for manipulators, the clamp comprising: two jaws; a body provided with two coplanar seats for housing the jaws, wherein the jaws are both translatable in parallel in a respective seat alternately, between a retracted position and an extended position; an electric motor for actuating the jaws, the motor having a shaft; an electronic unit for controlling the electric motor, housed inside the body of the clamp; a transmission assembly operatively interposed between the electric motor and the jaws, wherein the transmission assembly comprises: two pushing screws, coplanar and parallel to said housing seats, provided with respective and reciprocally engaged gear wheels, in which one of the two pushing screws is rotated by the electric motor and rotates, in its turn, the other pushing screw in the opposite way; two translation assemblies, each of which pushes a jaw to translate and is meshed with the threaded portion of the respective pushing screw, which causes the displacements thereof in response to an activation of the electric motor.

2. Clamp according to claim 1, wherein each translation assembly comprises a tow slide meshing the threaded portion of the respective pushing screw, a cursor translationally integral with the respective jaw and movable with respect to the tow slide in a direction parallel to a stroke of the jaw, and one or more elastic and preloaded balancing elements, which are interposed between the tow slide and the cursor.

3. Clamp according to claim 2, wherein the cursor and the tow slide can translate both integrally, as long as the preload of the elastic balancing element does not change, and independently one from another, in response to a change of the load acting onto the elastic balancing element caused by a resistance in opposition to the translation movement of the jaws.

4. Clamp according to claim 2, wherein the stroke of the jaws is greater than 15 mm.

5. Clamp according to claim 1, wherein the seats for housing the jaws are provided, at a bottom portion thereof, with an eyelet and wherein a pin is inserted in said eyelet for connecting the translation assembly to the respective jaw.

6. Clamp according to claim 1, wherein the two jaws both comprise a rack portion and the clamp further comprises a gear wheel pivoted to the body of the clamp and interposed between the two jaws, engaging both the rack portions.

7. Clamp according to claim 1, wherein the electric motor is a brushless type.

8. Clamp according to claim 1, wherein the unit for controlling the electric motor is a microprocessor type, and is provided with an electric connector.

9. Clamp according to claim 1, wherein the pushing screws are made of a material selected from steel and acetalic resin filled with carbon fibers.

10. Clamp according to claim 1, characterized in that the clamp has no unit outside of the clamp for controlling the electric motor.

* * * * *